Figure 11:
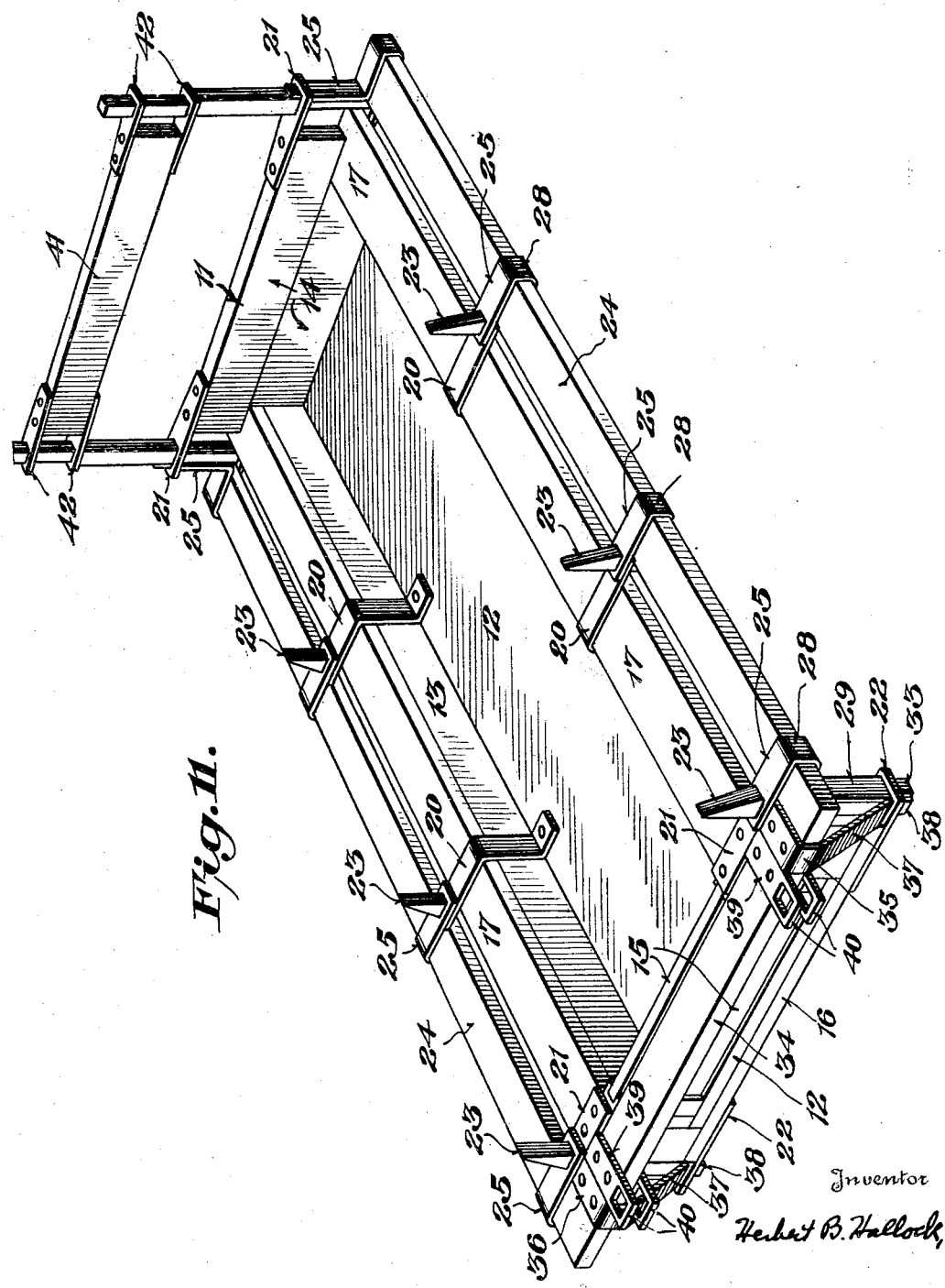

Feb. 3, 1931. H. B. HALLOCK 1,791,409
VEHICLE BODY
Filed Oct. 26, 1929 3 Sheets-Sheet 1
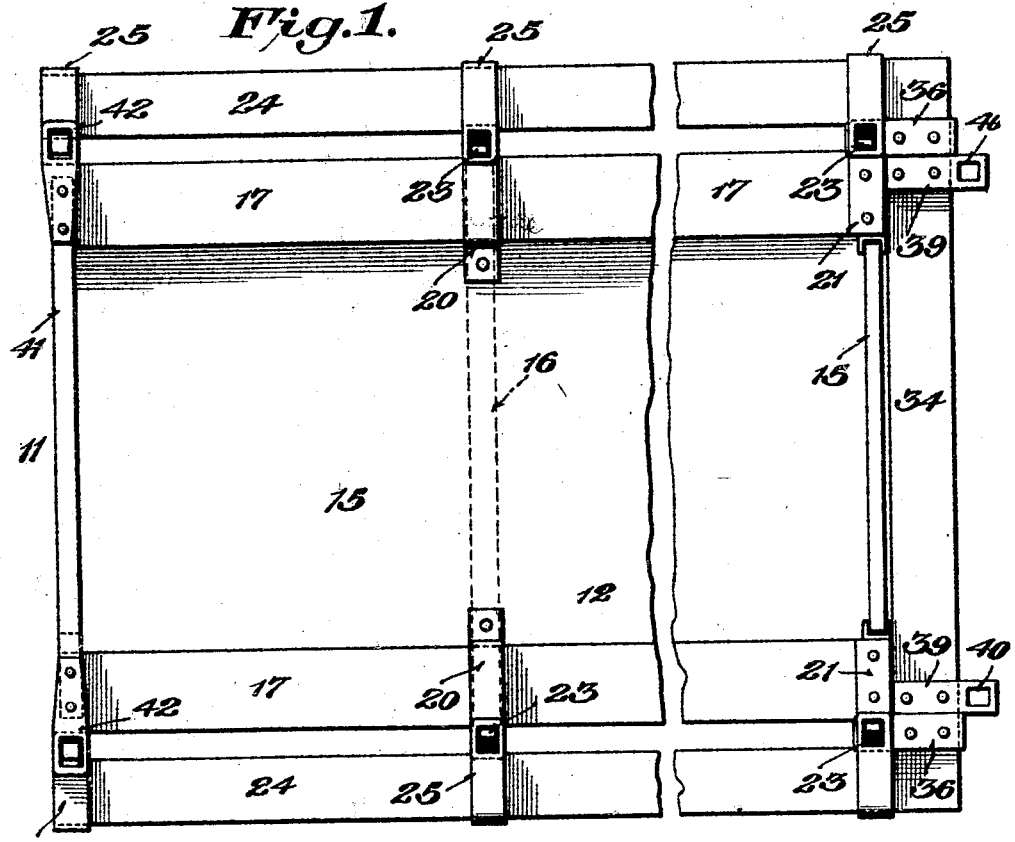
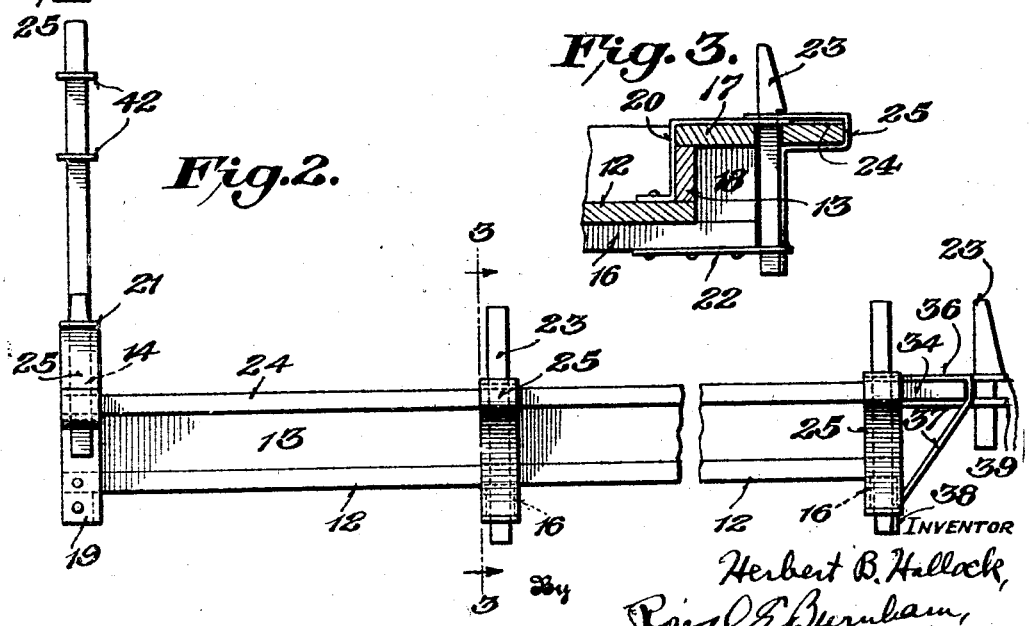
INVENTOR
Herbert B. Hallock,
Royal E. Burnham,
Attorney

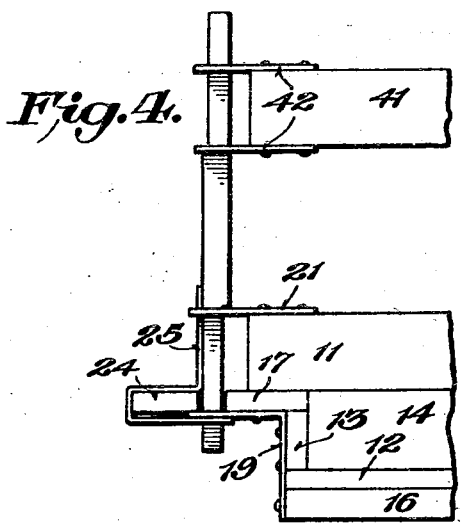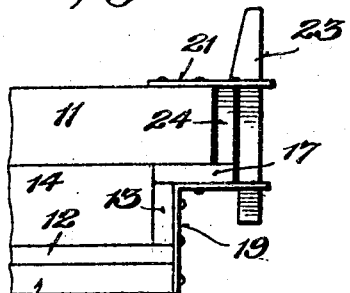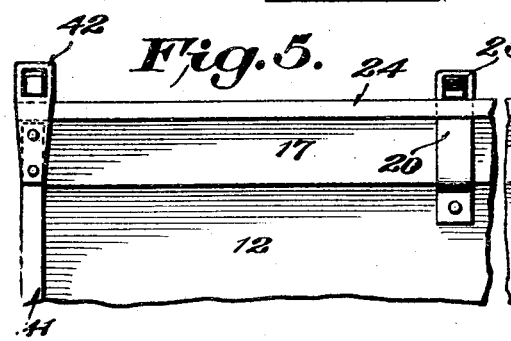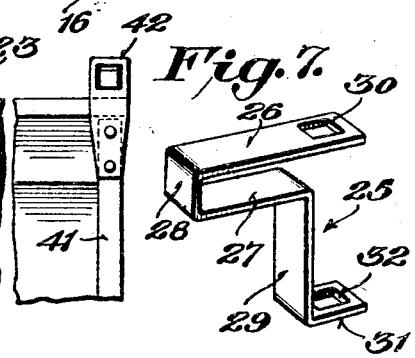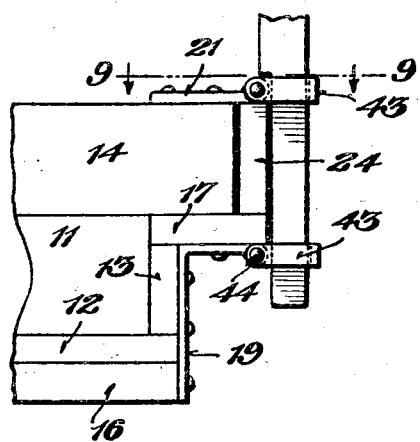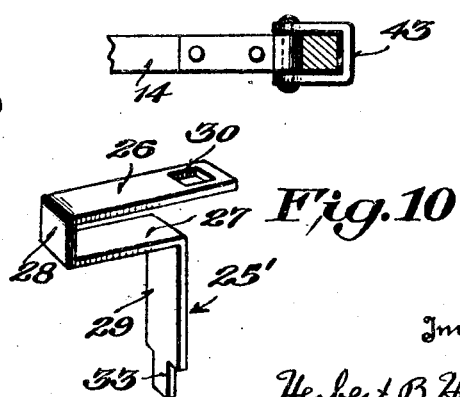

Feb. 3, 1931.  H. B. HALLOCK  1,791,409
VEHICLE BODY
Filed Oct. 26, 1929  3 Sheets-Sheet 3

Inventor
Herbert B. Hallock,
By Rozal E. Burnham,
Attorney

Patented Feb. 3, 1931

1,791,409

UNITED STATES PATENT OFFICE

HERBERT B. HALLOCK, OF ATHENS, NEW YORK

VEHICLE BODY

Application filed October 26, 1929. Serial No. 402,667.

This invention relates to vehicle bodies of the type that are suitable for carrying the general run of material of various sorts and are adapted to be converted for the carrying of hay, straw, and other material in bulk.

It is an object of the invention to provide a body of that kind that can be fitted with side extensions to accommodate straw, hay, or the like, that can have its capacity increased for the carrying of other sorts of materials, and in which the extensions for both purposes easily may be associated with the body proper and removed therefrom, without the use of tools.

When considered with the description herein, the characteristics of the invention are apparent from the accompanying drawings, forming part hereof, wherein an adaptation of the invention that now is considered to be a preferable one is disclosed, for purposes of illustration.

Although there is disclosed herein an adaptation that is considered to be preferable, it is to be understood that it is not the intention to be limited necessarily thereto in interpretation of the claims, as modifications and adaptations within the limits of the claims can be made without departing from the nature of the invention.

Like reference-characters refer to corresponding parts in the views of the drawings, wherein—

Fig. 1 is a plan view;
Fig. 2 is a side elevation;
Fig. 3 is a section on the line 3—3, Fig. 2;
Fig. 4 is a fragmentary front elevation, the side extension member being in horizontal position;
Fig. 5 is a fragmentary plan view;
Fig. 6 is a fragmentary front elevation, the side extension member being in vertical position;
Fig. 7 is a view of one form of side fitting;
Fig. 8 is an elevation showing a form of stake-socket;
Fig. 9 is a plan view, partly in section, on the line 9—9, Fig. 8;
Fig. 10 is a view of another form of side fitting;
Fig. 11 is a perspective view of the body.

In the drawings, 11 designates a body, which, as shown for purposes of illustration, is of conventional wagon-box type, except as hereinafter described, and has a floor or bottom 12, sides 13, and a front end 14 extending above the sides, all being permanently assembled; and a removable end-gate 15. The body is adapted to be carried on a running-gear (not shown) in any suitable manner.

Underneath the body, and connected thereto, there are transverse sills 16, which, with exception of that at the front end, extend beyond the floor, as shown by Fig. 3.

Longitudinal boards or other suitable flat members 17 extend laterally and outwardly from the top of the sides 13, and they constitute permanent extensions of the body. They rest on the top of the sides and beyond the sides are supported by blocks or other suitable pieces 18 carried by the extending end portions of the sills 16, and by angle-irons 19 secured to the sides at the front and which project laterally beyond the boards and there are formed with stake-sockets.

The body is braced and strengthened between its ends, directly above the sills 16, by inside members 20 of strong metal so shaped that they seat against the bottom 12, sides 13, and extensions 17, to which they are secured, the members 20 projecting beyond the extensions 17 and there having stake-sockets. Strong metallic plates 21 are secured to and project beyond the extensions 17 at the rear and are secured to and project beyond the top of the front end wall 14, their projecting end portions having stake-sockets; and similar plates 22, having end stake-sockets, are secured to the under sides of the sills 16. All of the stake-sockets are disposed substantially in the same vertical plane on each side of the body, and they are arranged to receive and to hold stakes 23.

Boards or other suitable flat members 24 are usable as lateral substantially horizontal extensions of the members 17 and also as substantially vertical sides above the members 17, when associated with fittings as hereinafter described.

Fittings 25, preferably made of stout metal, of the forms shown more particularly by Figs. 7 and 10, are provided for holding the members 24 on the body. The material of each fitting is shaped to provide a head of substantially parallel webs 26 and 27 connected by a part 28, and a leg 29 terminating in a foot. The upper web 26 has an opening 30 for a stake. In the form shown by Fig. 7, a foot 31, disposed substantially parallel to the webs, has a stake opening 32 aligned with that of the web 26. In the form shown by Fig. 10, the leg terminates in a downwardly-extending foot 33 arranged to project into a stake-socket.

The fittings are such that the members 24 may be inserted snugly between the webs 26 and 27, from which they easily are removable when the members 24 are to be used in another manner as hereinafter described.

When the members 24 are to be installed as lateral or flat substantially horizontal extensions of the members 17, the members 24 are put between the webs 26 and 27 so that the fittings 25 are positioned at places corresponding to the location of the stake-sockets of the members 20 and plates 21 and 22, and a fitting 25 is associated in reversed position with the front end of each member 24 as shown by Fig. 4. When the fittings are of the form shown by Fig. 10, the feet 33 are inserted upwardly into the sockets of the plates 21 at the front and downwardly into the sockets of the other plates 21 at the bottom, and the openings 30 are made to register with the sockets of the members 20 and the angle-irons 19. Stakes 23 then are passed through and into the sockets, whereby the parts are held reliably together. When fittings of the type shown by Fig. 7 are used, the parts are assembled in substantially the same way, except that the openings of the feet 31 are made to register with the adjacent sockets so that the stakes may pass through them.

In order to provide an extension at the rear end of the body in substantially the same plane as the members 17 and 24, a transverse board or other suitable flat member 34 is used. This member is attached to the body and supported by fittings 35, one near each end. Each fitting comprises a head 36 disposed on top of the member 34 and projecting beyond that member at its free end, where it is formed with a stake-socket positioned to register with that of one of the plates 21 at the rear. The fitting also includes a depending forwardly-deflected leg 37, which may have a foot 38 like that shown by the fitting disclosed by Fig. 10 arranged to enter the socket of the adjacent lower plate 22; or the leg may have a socketed foot like that shown by Fig. 7 arranged to register with that of the plate 22. When the member 34 is to be put into place, it is shoved against the rear end of the body until the sockets of its fittings are in registry with those of the plates 21, and the feet of the fittings inserted into or brought into registry with the sockets of the adjacent lower plates 22, stakes then being placed in the sockets and holding the member 34 and also the fittings 25 at the rear at the same time. Strong metallic plates 39 are secured to the top and bottom of the member 34 and project rearwardly therefrom, and they are formed with stake-sockets 40 in their projecting portions.

The stakes carried at the front in the sockets of the angle-irons 19 and plates 21 may be longer than the others, in order that they may carry above the body a transverse member 41 by means of projecting end-socketed plates 42 through which the stakes extend.

When it is desired to increase the capacity of the body for carrying threshed or shelled grain or other granular or similar material, as distinguished from hay, straw, or the like, the fittings 25 and the member 34 are dispensed with, the member 41 is transferred from the front to position over the end-gate, the members 24 are placed on edge on the longitudinal side extensions of the body with their rear ends between the projecting ends of the plates 42 and their front ends under the plates 21 on the front wall, and stakes are disposed in the aligned sockets of the parts involved, and also in the sockets of the intermediate members 20 and 22, as shown by Figs. 5 and 6, whereby the parts are held in place, the members 24 and their cooperating parts being so proportioned that those members fit closely between the plates 42 at the rear and between the plates 21 and the permanent side extensions 17 at the front.

If desired, in order to avoid the presence of projections beyond the body proper when extensions are not being used, the parts 19, 20, 21, and 22, instead of having integral or rigid socketed end portions, may have sockets afforded by substantially U-shaped yokes 43 pivoted to the parts 19, etc., at the free ends of their legs by bolts or other suitable pivots 44, so that the yokes, when not in use, may depend from the parts to which they are connected.

What I claim as new, and desire to secure by Letters Patent, is—

1. A vehicle-body having upper and lower sockets at its sides, longitudinal extension members, attaching fittings for said members having upper sockets registrable with said upper body sockets and feet cooperable with said lower body sockets, and stakes insertable into said body and fitting sockets whereby to hold said fittings and members on the body.

2. A vehicle-body having upper and lower sockets at its sides, longitudinal extension members, attaching fittings for said members having upper and lower sockets registrable with said body sockets, and stakes insertable through the sockets of said body and fittings.

3. A vehicle-body having upper and lower sockets in its sides, longitudinal and transverse extension members, attaching fittings for said members having upper sockets registrable with said body sockets and feet cooperable with said lower sockets, and stakes insertable into said body and fitting sockets whereby to hold said fittings and members on the body.

4. A vehicle-body having side sockets at its ends, a transverse wall at one end having socketed extensions projecting beyond its ends, a transverse member having socketed extensions projecting beyond its ends arranged to be placed at the other end of the body, said body and extension sockets being in substantially the same vertical plane on each side when parts are in place, flat longitudinal extension members, fittings having sockets registrable with those of the body and arranged to hold said extension members on the body in a substantially horizontal plane, and stakes insertable into sockets whereby to hold fittings and extension members on the body, said fittings being removable from said longitudinal members and said longitudinal members being adapted to be placed on edge under said socketed extensions at the front and rear.

In testimony whereof I affix my signature.

HERBERT B. HALLOCK.